No. 664,410. Patented Dec. 25, 1900.
W. C. JARVIS.
APPARATUS FOR HANDLING ANIMAL CARCASSES.
(Application filed July 2, 1900.)
(No Model.)
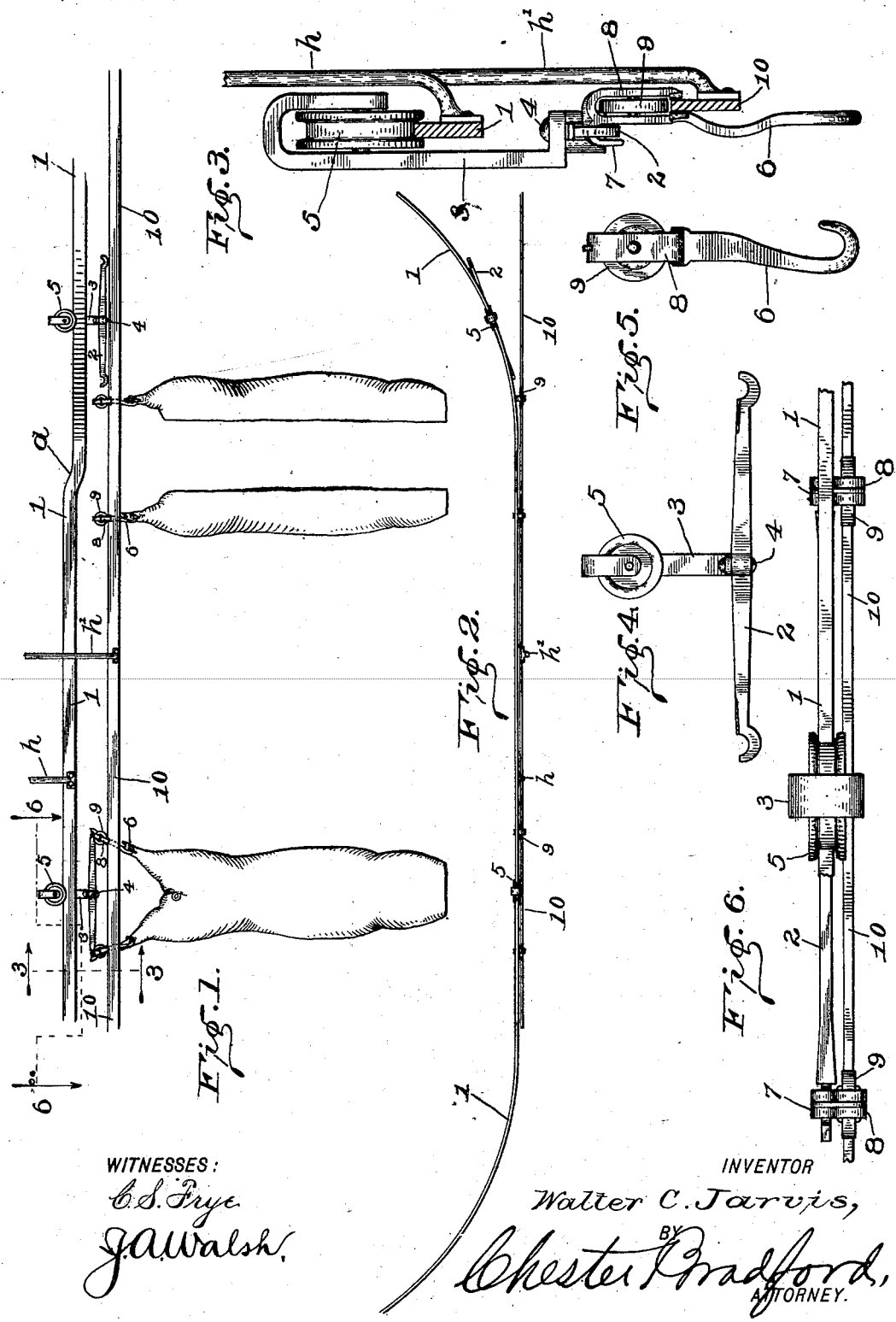
WITNESSES:
C. S. Frye
J. A. Walsh
INVENTOR
Walter C. Jarvis,
BY Chester Bradford,
ATTORNEY.

UNITED STATES PATENT OFFICE.

WALTER C. JARVIS, OF INDIANAPOLIS, INDIANA.

APPARATUS FOR HANDLING ANIMAL-CARCASSES.

SPECIFICATION forming part of Letters Patent No. 664,410, dated December 25, 1900.

Application filed July 2, 1900. Serial No. 22,331. (No model.)

*To all whom it may concern:*

Be it known that I, WALTER C. JARVIS, a citizen of the United States, residing at Indianapolis, in the county of Marion and State of Indiana, have invented certain new and Improved Apparatus for Handling Animal-Carcasses in Packing-Houses, of which the following is a specification.

It is customary in packing-houses to provide a system of tracks upon which the carcasses of slaughtered animals after being dressed shall be transported from place to place. In the system heretofore in use what is known as a "gambrel" has been required for each carcass, and in large packing-houses several thousand of such gambrels have been required. By my invention I am able to reduce this number to a few hundred. The use of such gambrels as heretofore employed has also involved the danger when the carcass was cut in halves of the pieces slipping off and falling upon the floor, and thus becoming soiled and damaged. Where my invention is used, this danger is wholly obviated.

My said invention consists, therefore, in an improved apparatus for handling these carcasses and parts of carcasses by which by far the greater portion of gambrels (or bars of like character) are dispensed with altogether and the danger of dropping and thus soiling or damaging the meat greatly reduced. Such a system will be first described and the novel features thereof then pointed out in the claim.

Referring to the accompanying drawings, which are made a part hereof, and on which similar reference characters indicate similar parts, Figure 1 is a fragmentary elevation of tracks such as are used in my improved system, showing two carcasses suspended therefrom, one before the same is split in half and suspended to a gambrel upon the upper or first track and the other after the same has been split in half and removed from the gambrel, the two halves being suspended separately upon the lower or second track; Fig. 2, a top or plan view of such tracks with the gambrels and hangers thereon; Fig. 3, a transverse sectional view through the tracks, showing the hangers, gambrel, &c., as the same appear when looking in the direction indicated by the arrows from the dotted line 3 3 in Fig. 1 and on a much-enlarged scale; Fig. 4, a side elevation of a gambrel such as is used in my system separately and also on an enlarged scale; Fig. 5, a similar view of a hanger separately; and Fig. 6, a top or plan view, on the same scale as Fig. 3, as seen when looking downwardly from the dotted line 6 6 in Fig. 1.

The upper or primary track 1 may be understood to be a continuous track passing around the space where the cleaning of the carcasses is performed and where so much of the cutting up is performed as reduces the body into halves, as shown at the right in Fig. 1. This track is suspended by any suitable hangers, as $h$, so positioned as to leave the upper edge of the track free. At that point in said track near where the carcass is finally cut into halves, as at $a$, this track has a downward inclination for purposes which will be presently explained.

Mounted on the track 1 is a hanging apparatus, including the device usually denominated a "gambrel" or its equivalent. In my system this is composed of a gambrel-bar 2, a hook-like hanger-piece 3, to which said gambrel-bar is centrally secured, preferably by a pivot 4, on which said gambrel-bar may be horizontally revolved, and a truck 5, which rests immediately on the track 1. When a carcass is suspended on the gambrel-bar 2, it, as is obvious, is easily moved along the track 1 from place to place, the truck 5 running easily on said track.

The carcass is immediately connected to hangers 6, the point of connection with the carcass being the lower hook-shaped ends of said hangers, as shown. The upper ends of these hangers 6 are bifurcated, one portion turning in one direction and the other portion in the other direction. The portion 7 is adapted to hook over an end of a gambrel-bar 2 and into a notch in such gambrel-bar end provided to receive the same, as best shown in Fig. 4. The other portion 8 bends over in the other direction and serves both to support a truck 9 and to extend down and embrace the upper edge of the lower or secondary track 10. The end of this part 8 and the adjacent portion of the shank of the hook 6 extend in close to the surface of the two sides of the upper portion of said track and form guards whereby the hanger is securely prevented from leaving said track when mounted thereon, as will be best seen by an examination of Fig. 3.

As is clearly shown in the drawings, the two tracks 1 and 10 are similarly supported by the hangers $h$ and $h'$ and are arranged in such relation to each other that the trucks 5 are immediately above the track 1 when the trucks 9 are immediately above the track 10. The vertical distances are so arranged as that the trucks 9 shall bear very lightly, if at all, on the tracks 10 until after the trucks 5 have reached the downwardly-inclined point $a$ in the track 1. When this point is reached, the gambrel is permitted to descend sufficiently to be freed from engagement with the hangers, which thereupon become supported on the lower track 10, while the gambrels are free to return around the track 1 for further use, and each of the halves of the carcass is separately and securely supported by one of the hangers, as illustrated at the right in Fig. 1 of the drawings.

Having thus fully described my said invention, what I claim as new, and desire to secure by Letters Patent, is—

The combination, in an apparatus for handling animal-carcasses in packing-houses, of two tracks, one arranged somewhat higher than the other and having at a suitable point a declivity therein, a truck mounted on the upper track, a gambrel suspended from the truck, a pair of auxiliary trucks separably connected with the gambrel and adapted to take the lower track when the main truck descends the declivity in the upper track, and means for hanging the carcasses to said auxiliary trucks, all substantially as described and for the purposes specified.

In witness whereof I have hereunto set my hand and seal, at Indianapolis, Indiana, this 29th day of June, A. D. 1900.

WALTER C. JARVIS. [L. S.]

Witnesses:
CHESTER BRADFORD,
JAMES A. WALSH.